(12) United States Patent
Mombourquette et al.

(10) Patent No.: US 7,747,388 B2
(45) Date of Patent: Jun. 29, 2010

(54) SYSTEMS AND METHODS FOR ACQUIRING DATA IN THERMAL RECOVERY OIL WELLS

(75) Inventors: Ivan Mombourquette, Calgary (CA); Kirby Jabusch, Edmonton (CA); Colin Bussiere, Ardrossan (CA)

(73) Assignee: Core Laboratories Canada Ltd, Calgary, Alberta (CA)

( * ) Notice: Subject to any disclaimer, the term of this patent is extended or adjusted under 35 U.S.C. 154(b) by 262 days.

(21) Appl. No.: 11/406,152

(22) Filed: Apr. 18, 2006

(65) Prior Publication Data
US 2006/0250274 A1   Nov. 9, 2006

Related U.S. Application Data

(60) Provisional application No. 60/672,404, filed on Apr. 18, 2005.

(51) Int. Cl.
*G01V 1/40* (2006.01)
(52) U.S. Cl. ....................................................... 702/11
(58) Field of Classification Search ...................... 702/2, 702/6, 9, 11, 12, 14, 16; 166/64, 250.15, 166/381; 73/152.12, 152.54
See application file for complete search history.

(56) References Cited

U.S. PATENT DOCUMENTS

| | | | |
|---|---|---|---|
| 3,672,215 A * | 6/1972 | Stout et al. | 73/152.12 |
| 4,811,598 A | 3/1989 | Dillier et al. | |
| 5,509,474 A * | 4/1996 | Cooke, Jr. | 166/64 |
| 6,116,085 A | 9/2000 | Moffatt et al. | |
| 6,167,965 B1 * | 1/2001 | Bearden et al. | 166/250.15 |
| 2002/0066309 A1 * | 6/2002 | Tubel et al. | 73/152.54 |
| 2004/0256113 A1 * | 12/2004 | LoGiudice et al. | 166/381 |

\* cited by examiner

*Primary Examiner*—Mohamed Charioui
(74) *Attorney, Agent, or Firm*—Mossman, Kumar & Tyler, PC

(57) ABSTRACT

In connection with thermal recovery projects, a system determines temperature gradients for a heat affected zone associated with a subterranean hydrocarbon reservoir. An exemplary system includes a plurality of temperature sensors distributed in the wellbore at least partially along the heat affected zone. A downhole processor positioned proximate and substantially outside of the heat affected zone receives and digitizes the temperature measurements. A data link such as a data cable coupled to the downhole processor conveys the temperature measurements to a surface interface.

23 Claims, 9 Drawing Sheets

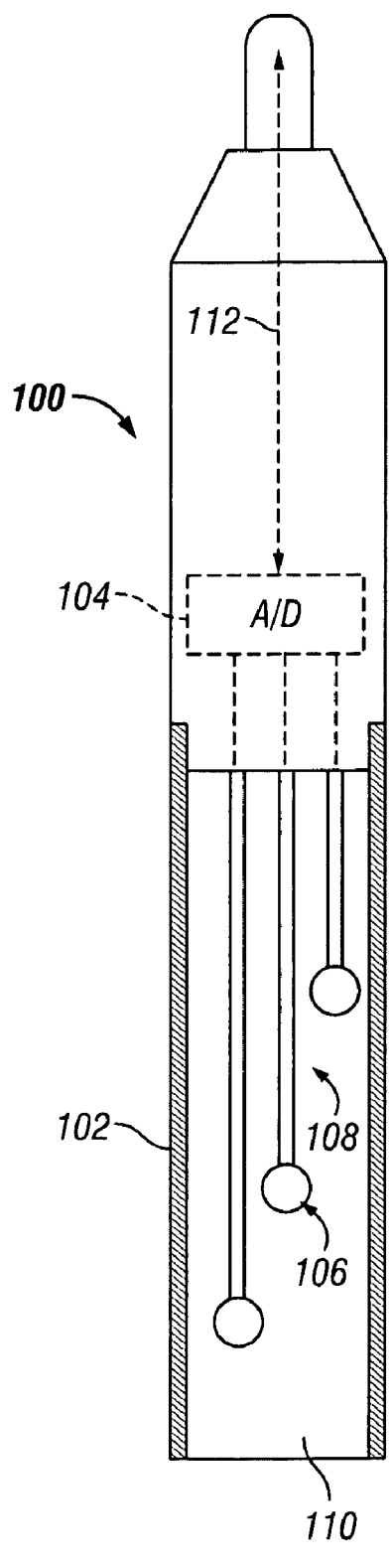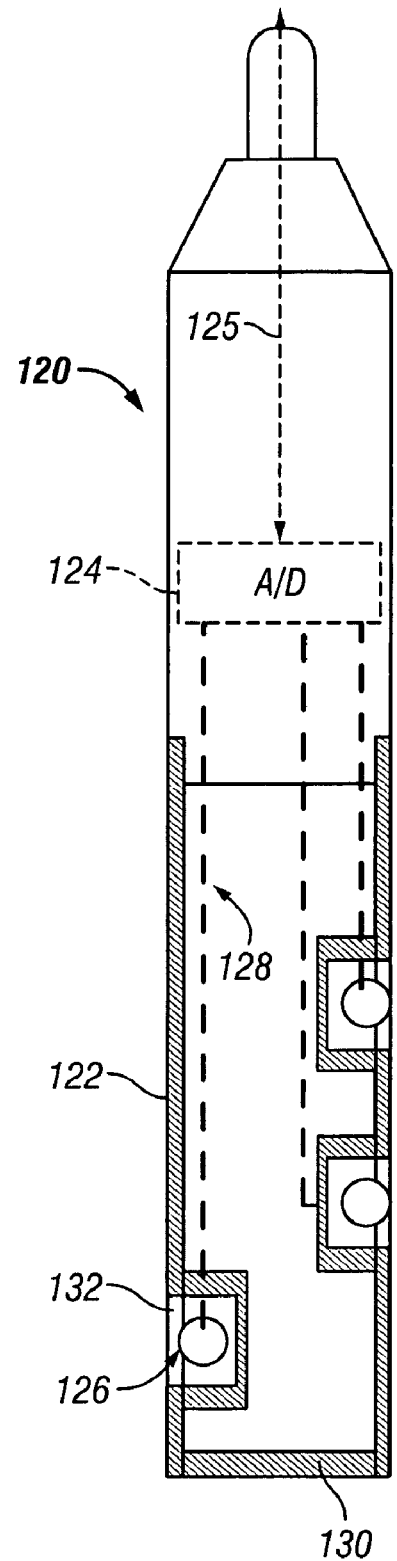
FIG. 4A
FIG. 4B

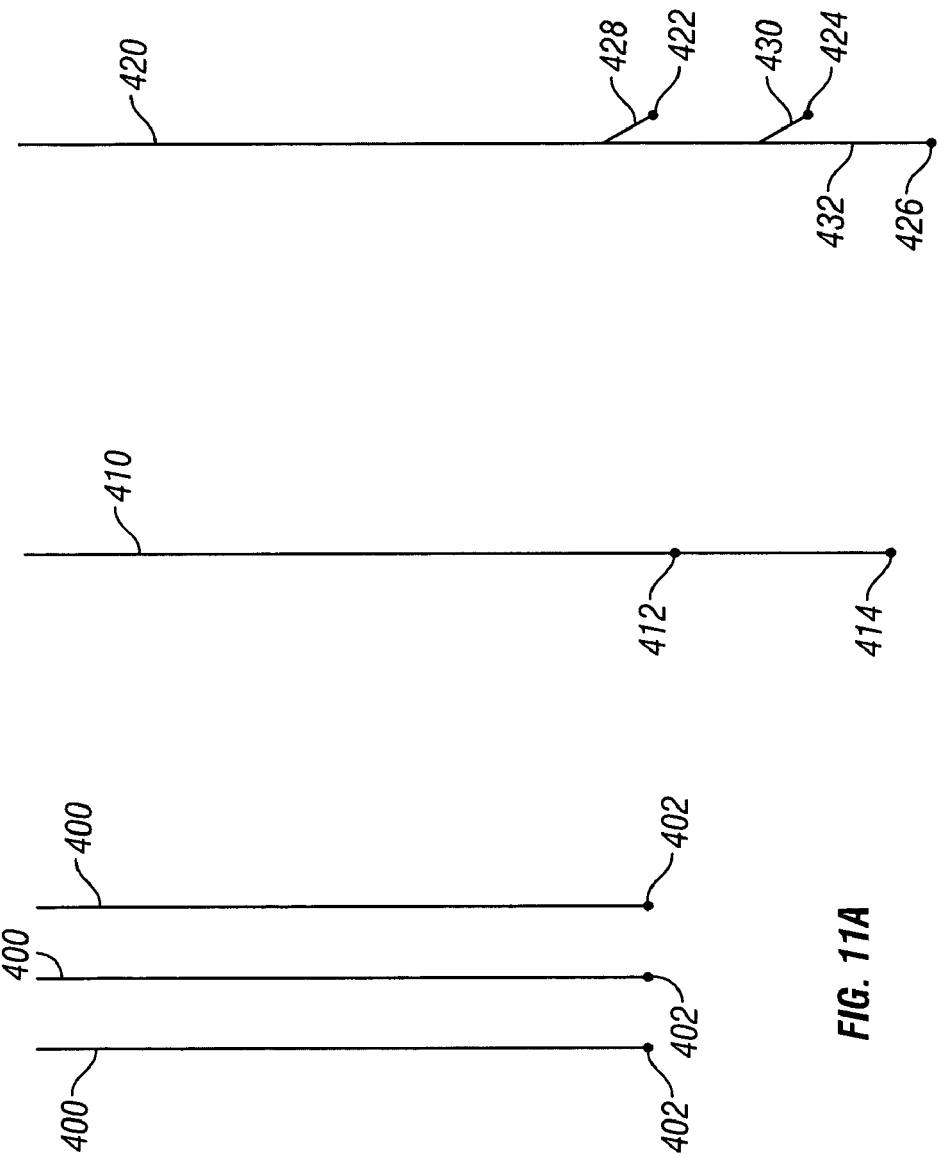

SYSTEMS AND METHODS FOR ACQUIRING DATA IN THERMAL RECOVERY OIL WELLS

CROSS-REFERENCE TO RELATED APPLICATIONS

This application Claims the benefit of earlier filed provisional U.S. Patent Application Ser. No. 60/672,404, filed on Apr. 18, 2005.

BACKGROUND OF THE INVENTION

1. Field of the Invention

The present invention relates to data acquisition systems and methods for oil and gas wells. In one aspect, the present invention relates to systems and methodologies for determining temperature gradients in connection with thermal recovery projects involving oil or gas wells.

2. Description of the Related Art

There exists throughout the world major deposits of heavy oils which, until recently, have been substantially ignored as sources of petroleum since the oils contained therein were not recoverable using ordinary production techniques. These oil deposits are also referred to as heavy oil, or bitumen. For example, it was not until the 1980's that much interest was shown in the heavy oil deposits of the Alberta province in Canada even though many deposits are close to the surface and represent an estimated petroleum resource upwards of many billion barrels.

It is well known that heat can be employed to recover hydrocarbons from underground formations such as those found in the regions noted above. Often referred to as thermal recovery projects, the well owner uses heat to reduce the viscosity of the petroleum to a level where it will readily flow to wells from which it can be recovered to the surface of the earth. Steam and/or hot water flooding are commonly used for this purpose and have been very successful in some formations for stimulating recovery of viscous petroleum which is otherwise essentially unrecoverable. Steam flooding is a thermal oil recovery method which has enjoyed increased popularity in recent years and is often the most commercially practical method or process.

Steam flooding can be utilized in a single well by the so called "huff-and-puff" technique. That method involves first injecting steam into a vertical well, then shutting in the well for a "soak", wherein the heat contained in the steam raises the temperature and lowers the viscosity of the petroleum. Thereafter, a production period begins wherein mobilized petroleum is produced from the well, usually by pumping. This process can be repeated over and over again.

Steam flooding may also be utilized as a thermal drive means by injecting steam into the reservoir through one or more vertical injection wells. This steam then moves through the subterranean reservoir mobilizing and volatilizing the petroleum it encounters. This steam-flood front moves through the reservoir towards a production well wherefrom the petroleum fluids are produced. This steam drive process is often more effective than the "huff-and-puff" method inasmuch as the potential volume of the reservoir which can be swept by the process is greater.

Alternate methods are also available to heat and mobilize the oil or bitumen in the reservoir. These include the use of hot solvent, hot gas, hot air as well as underground burning or combustion.

Thermal oil recovery projects such as those described above require temperature monitoring of the downhole temperature in the reservoir. Conventionally, temperature data is obtained via sensors positioned in both vertical observation wells and horizontal production wells. Historically, monitoring of thermal oil reservoirs utilized either multi-point thermocouple sensors or distributed temperature fiber optic cable in order to obtain multi-point readings and therefore infer a temperature profile in the reservoir. Many individual points are desired and therefore it is necessary to obtain a multitude of readings. Twenty points are often obtained in order to create a temperature profile across the formation. Typically, a thermocouple (e.g., a mineral insulated (MgO) thermocouple) is positioned at each selected temperature measurement point in the wellbore and connected to a surface interface with two wires. As is known, two wires are required for each thermocouple because two different alloys are connected together at the junction of the thermocouple. As can be appreciated, the costs of such wiring can become considerable because the length traversed by the wires can approach several kilometers. Furthermore, the data transmitted across these relatively long spans of wiring or cables can degrade and weaken and be corrupted by noise. The long lengths are also prone to accuracy loss caused by wire impurities, insulation breakdown, and low voltage signal degradation. Likewise, fiber optic cables sensors as well as the associated fiber optic cables are relatively expensive and prone to degradation in signal accuracy and strength due to hydrogen related problems with the glass fiber. Moreover, in both instances, the splices or couplings between individual lengths of cable can introduce noise and errors into the transmitted data. Yet another difficulty and expense arises from the need to effectively seal and pack-off multiple wires or multiple bundles of cables exiting the wellhead. As is known, effective wellhead sealing can be essential to containing a well blow out.

The present invention addresses these and other drawbacks of the prior art.

SUMMARY OF THE INVENTION

In aspects, the present invention provides a system for acquiring data from a heat affected zone associated with a thermal recovery hydrocarbon reservoir in a subterranean formation. In one embodiment, the system includes a downhole processor, a plurality of sensors, and data links or carriers. The processor is positioned at a selected location along a wellbore that intersects the reservoir. The sensors are distributed along the wellbore and at least partially along the heat affected zone. The data link couples the processor to a surface interface and data carriers couple the sensors to the processor. The processor can be positioned outside of affected zone or other suitable location along the wellbore. The processor processes data received from the sensors using equipment such as a digitizer, a multiplexor, a signal processor, a switching device, a relay, a laser diode, a laser, an optical light detector, and an optical filtering devices. The data link can transmit data from the processor to the surface using any number of transmission media including, but not limited to, acoustical signals, radio frequency signals, electromagnetic signals, and pressure pulses.

In one application, the system is adapted to determine a temperature gradient for a heat affected zone associated with a thermal recovery hydrocarbon reservoir. In such an application, a plurality of temperature sensors are distributed in the wellbore at least partially along the heat affected zone. A downhole processor positioned proximate to the heat affected zone receives and digitizes the temperature measurements. The digitized temperature measurements are conveyed to the surface via a data cable coupled to the downhole processor.

In arrangements where the system is adapted to acquire temperature data, the sensors can be thermocouples or a fiber optic sensors. For system using thermocouples, suitable wiring arrangements between the thermocouples and the processor include, but are not limited to a simplex wire arrangement, a duplex wire arrangement, and a triplex wire arrangement. For systems using fiber optic sensors, a frequency multiplexed optical fiber can be used to couple the fiber optic sensors to the processor.

It should be understood that examples of the more important features of the invention have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIG. 4A schematically illustrates a sectional view of a coiled tubing arrangement having a signal/data communication system made according to one embodiment of the present invention;

FIG. 4B schematically illustrates a sectional view of a coiled tubing arrangement having a signal/data communication system made according to one embodiment of the present invention;

FIG. 11A-11C schematically illustrates data carrier exemplary data carrier arrangements for fiber optic sensors used in accordance with embodiments of the present invention.

Similar reference characters denote corresponding features consistently throughout the attached drawings.

DETAILED DESCRIPTION OF THE PREFERRED EMBODIMENT

Figure 1:
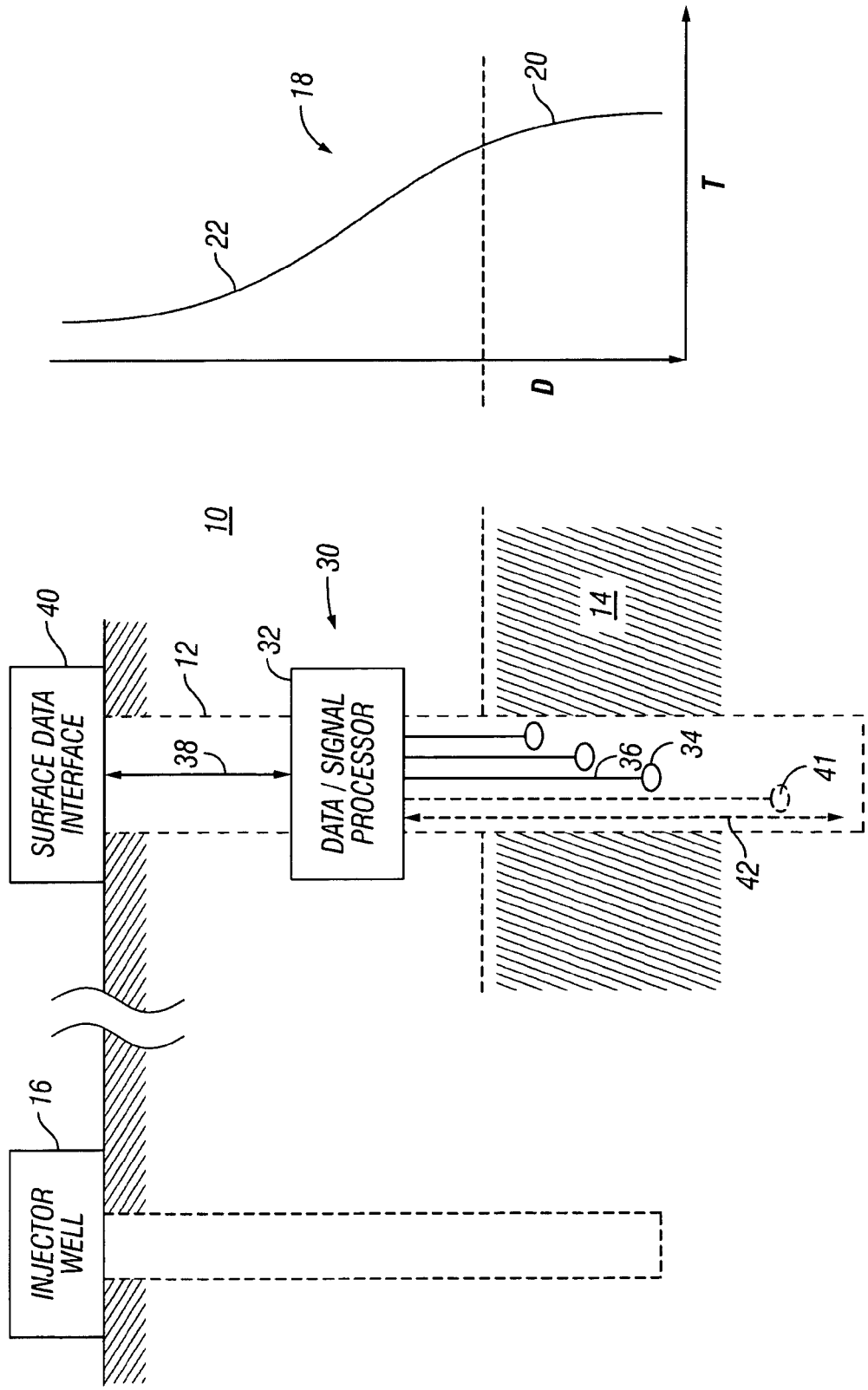
FIG. 1A schematically illustrates one embodiment of a signal/data communication system made according to one embodiment of the present invention.
FIG. 1B graphically illustrates an exemplary temperature gradient associated with a formation having a "heat affected zone;"

The present invention relates to devices and methods for acquiring and transmitting signals/data from a wellbore to a surface location. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

Referring initially to FIG. 1A, there is schematically an arrangement for recovering hydrocarbons such as oil, heavy oil, or bitumen, from a subterranean formation 10. A wellbore 12 drilled into the formation 10 intersects a hydrocarbon reservoir or pay zone 14. The wellbore 12 can include known equipment such as a cemented casing. While one reservoir 14 is shown, it should be understood that the wellbore 12 can intersect multiple pay zones. Relative to the formation 10, the reservoir 14 has a relatively higher temperature that is attributed to natural sources or by an artificial source such as a steam injection well 16. The relatively higher temperatures can be considered to define a thermal oil zone, which can rise by enhanced thermal recovery, in geothermal wells, in SAGD (steam assisted gravity drainage) wells, and other instances where cyclic steam or a variety of other vapor or hot gas or hot liquid injection methods are used for thermal recovery.

Referring now to FIG. 1B, there is shown a graph with depth D along the vertical axis and temperature T along the horizontal axis. The FIG. 1B graph shows a representative temperature gradient 18 for the formation 10 of FIG. 1A. As can be seen, the temperature gradient 18 has two portions or intervals: a "heat affected zone" 20 associated with the reservoir 14 and a relatively cooler zone 22. It should be understood that the term "heat affected zone" generally refers to a region or zone where the prevailing temperature is higher than the natural geothermal temperature at that depth. The formation zone temperature is elevated by an artificially induced process that causes the oil or bitumen to flow. The term "heat affected zone" also refers to a region or zone where a naturally occurring heat sources raises the temperature to a level higher than what would otherwise occur at that depth. The elevated temperature can be outside the normal or recommended range of temperatures for a given tool, device, instrument, or operating condition. Thus, the term "heat affected zone" does not necessarily imply a specific temperature or temperature range. Rather, a zone can be considered "hot" if the ambient temperature compromises or impairs the structural integrity, operating efficient, operating life, or reliability of a given tool, device, or instrument. The "heat affected zone" can be induced by one or more injector wells 16 or other suitable sources.

The determination of the temperature gradient for the reservoir 14 and elsewhere can be made by a downhole data acquisition system 30 that includes a downhole processor 32 and one or more sensors 34 that transmit data via one or more data carriers 36 to the processor 32. The downhole processor 32 is a device adapted to process data and can include, but is not limited to a digitizer, multiplexing device, switching device, microprocessor, digital circuitry, analog circuitry, optical filtering device, wave division multiplexor, laser diodes, and lasers. The downhole processor 32 processes the sensor data and transmits the processed data via a communication/transmission link 38 to a surface signal/data receiving interface 40. Although one set of sensors 34 is shown for zone 14, other sensors 41 can be positioned in other locations of the wellbore 12. Additionally, additional communication/transmission links 42 can be used to provide data transfer between the downhole processor 32 and other processors (not shown) positioned elsewhere in the wellbore 12.

As used in this description, the term data carrier refers to one or more elements that can transmit at least data signals. The transmission can include electrical signals, magnetic signals, pressure pulses, and optical signals. Suitable elements include but are not limited to metal conductors, fiber optic cables, hydraulic conduits. Moreover, terms such as wires, cable, or cable bundle are used interchangeably and imply no particular configuration. Moreover, the term data carrier and data links are merely used to conveniently refer to the data transmission between the sensors and the processor and between the processor and the surface. Accordingly, no structural or functional differences are intended by such terminology (e.g., data links can include wires or cables and data carriers can include radio or electromagnetic wave).

In one embodiment, the sensors 34 are positioned along the heat affected zone 20 and include temperature sensors that transmit temperature measurements via the data carriers 36 to the processor 32. The temperature sensors can include thermocouple elements, resistive thermal devices (RTDs), thermistors, semiconductors junction (diodes), and fiber-optic sensors. Such sensors are well known devices and thus will not be discussed in further detail. Merely for convenience, thermocouples will be used as a representative temperature sensor. The processor 32 can include a multi-channel digitizer to digitize signal data, programs or algorithms to condition data (e.g., filtering noise, decimating data, etc.), and/or other suitable electronics for processing, recording, and transmitting data. The processor can also include known equipment not shown such as a power source, a signal booster to amplify signals that may weaken during transmission, and a transceiver transmitting data. It may also include any combination of but not be limited to a digitizer, multiplexing device, switching device, microprocessor, digital circuitry, analog circuitry, optical filtering device, wave division multiplexor, lasor diodes, and lasers. In one arrangement, the processor 32 is programmed to receive temperature data from multiple thermocouples, digitize the temperature data, and transmit the temperature data to the surface via the communication link 38.

The communication link 38 provides one-way or bi-directional transmission of data/signals between the processor 32 and the surface interface 40. The communication link 38 can include conductors such as electrical conductors and/or a fiber optic wires and/or one or more transmitters that use transmission media such as acoustical signals, radio frequency signals, and/or electromagnetic signals. Moreover, the communication link 38 can include a train of relay stations that relay signals uphole and/or downhole. Additionally the communication link may deliver power to the downhole tool and simultaneously allow communication to surface either through one electrical conductor, and/or a fiber optic fiber or multiple electrical conductors, and/or optic fibers. Additionally, in applications where the processor 32 or other downhole equipment require electrical power, the communication link 38 can include suitable power conductors such as electrical power cables. It should be appreciated that there is a fractional relationship between the number of data carriers 36 associated with the sensors 34 and the communication link 38. For instance, six carriers 36 can connect the sensors 34 to the processor 32 whereas one data cable (not shown) associated with the communication link 38 can connect the processor 32 to the surface interface 40. This six-to-one fractional relationship is merely illustrative. Other illustrative fractional relationships include forty sensor carriers to one communication link or twenty four sensor carriers to two communication links. Generally speaking, therefore, fewer communication links such as wires or cables are needed than thermocouple data carriers. One advantage resulting from this relationship is a reduction in wires or cables between the processor 32 and the surface interface 40. Minimizing the number of wires or cables in the wellbore 12 can facilitate manufacturing, design, deployment, and maintenance in several aspects. For example, a single cable can be more easily sealed at a wellhead than multiple cables. Maintaining adequate seals at the wellhead is, of course, of significant concern because hydrocarbons in a wellbore can sometimes be at relatively high-pressure. Failure of seals can lead to a well blowout, a hazardous condition for personnel and equipment.

Another advantage to effectively replacing multiple thermocouple wiring with a fractional number of communication links (e.g., one cable) is that thermocouple data carriers (e.g., mineral insulated thermocouples) are usually more expensive than devices/equipment for the communication link such as electrical cables. Thus, minimizing the length of thermocouple wiring will generally reduce the overall cost of the system 30.

Because the processor 32 operates as a transfer or relay mechanism between the thermocouple wiring and the communication link, it is advantageous to position the processor 32 as close as possible to the sensors 34 to reduce overall system cost. However, as noted above, the sensors 34 are positioned generally within the heat affected zone 20. The appropriate distance from the processor 32 to the sensors 34 and the heat affected zone 20 depends in part on the constituent components of the processor 32 and the rated operating conditions of these components. In some arrangements, the processor 32 can be inside or immediately adjacent to the heat affected zone 20 and be exposed to elevated temperatures if the processor 32 is sufficiently resistant to relatively high temperatures. Alternatively, the processor 32 can be positioned sufficiently far from the heat affected zone 20 such as to limit exposure to potentially harmful elevated ambient temperatures. In one arrangement, the processor 32 is positioned outside and adjacent to the heat affected zone 20.

Yet another advantage to effectively multiple thermocouple or fiber optic wiring with a fractional number of communication links (e.g., one cable) is that early conditioning and/or conversion of the temperature data and transmission of the conditioned/converted data across more robust communication devices can enhance overall data reliability and accuracy. As previously discussed, data transmitted across thermocouple data carriers are susceptible to degradation from factors such as noise and signal strength can weaken in relatively long lengths of thermocouple wiring.

Figure 2:
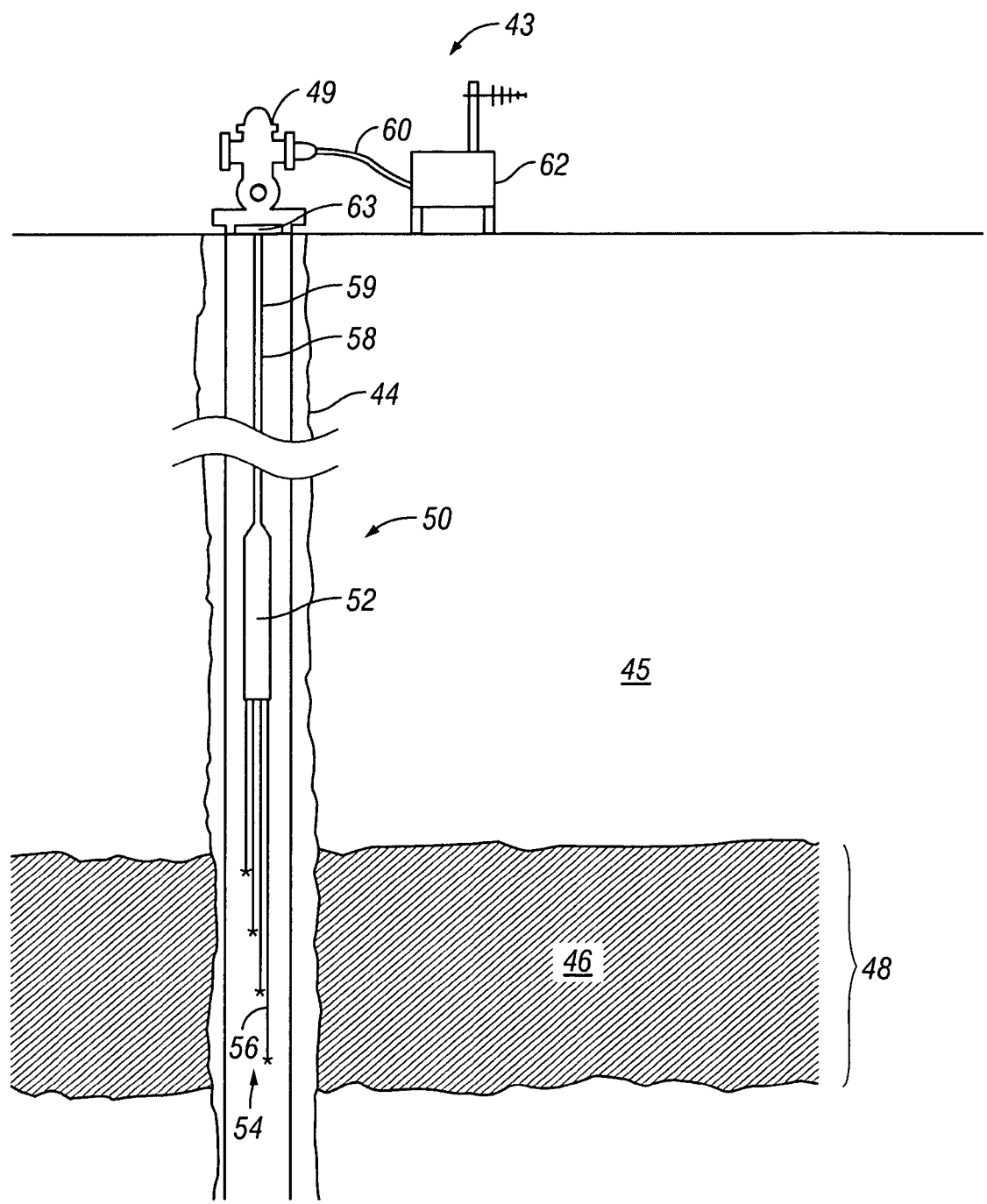
FIG. 2 schematically illustrates an elevation view of a vertical well provided with a signal/data communication system made according to one embodiment of the present invention.

Referring now to FIG. 2 there is shown a hydrocarbon recovery facility 43 for recovering hydrocarbons such as oil and gas from a generally vertical wellbore 44 formed in a formation 45. A wellhead 49 and associated equipment is positioned over the wellbore 44. The formation 45 has a hydrocarbon layer 46 and an associated heat affected zone 48 created artificially using previously described equipment and methodologies. An illustrative data acquisition system 50 for measuring temperature in the heat affected zone 48 and/or other downhole locations includes a multi-channel A/D processor 52, one or more thermocouples 54 and wiring 56 connecting the thermocouples 54 to the processor 52. In an exemplary arrangement, the thermocouples 54 are distributed across the heat affected zone 48 so that surface personnel can develop a temperature gradient for the hydrocarbon layer 46. This temperature gradient can be useful for determining the efficiency of the artificial heating and/or overall efficiency of the hydrocarbon recovery process. The processor 52 is uphole but proximate to the heat affected zone 48. During operation, the processor 52 converts analog temperature measurements from the thermocouples 54 to digital data and transmits the digital data via a downhole data link 58 and surface communication link 60 to a surface processor 62. The downhole data link 58 includes an insulated cable 61 suitable for a wellbore environment. The surface processor 62 can include suitable electronics to display, record, and/or analyze the received data. In an exemplary arrangement the processor could also be located below the heat affected zone and the communication cable traverses the zone, thus communicating the information to surface.

It should be appreciated that by utilizing the downhole processor 52 and data link 58, the FIG. 2 arrangement significantly reduces the amount of wiring 56 that would otherwise be required to obtain temperature data from the thermocouples 54 in the heat affected zone 48. Moreover, by positioning the processor 52 outside of the heat affected zone 48, the FIG. 2 reduces the complexity and expense related to designing and manufacturing electronic components capable of withstanding ambient temperatures that could approach exceed 150-300 degrees Centigrade in the heat affected zone 48. It should be understood, however, that the processor 52 may still encounter relatively higher ambient temperature conditions than the natural geothermal gradient of the well, but those temperatures do not materially degrade the operation, function or life of the processor 52.

Also, as FIG. 2 illustrates, a single cable 61 extends from the processor 52 to the surface. Thus, a seal assembly 63 for the cable 61 at the wellhead 49 can be configured as a single seal rather than a plurality of individuals seals.

Figure 3:
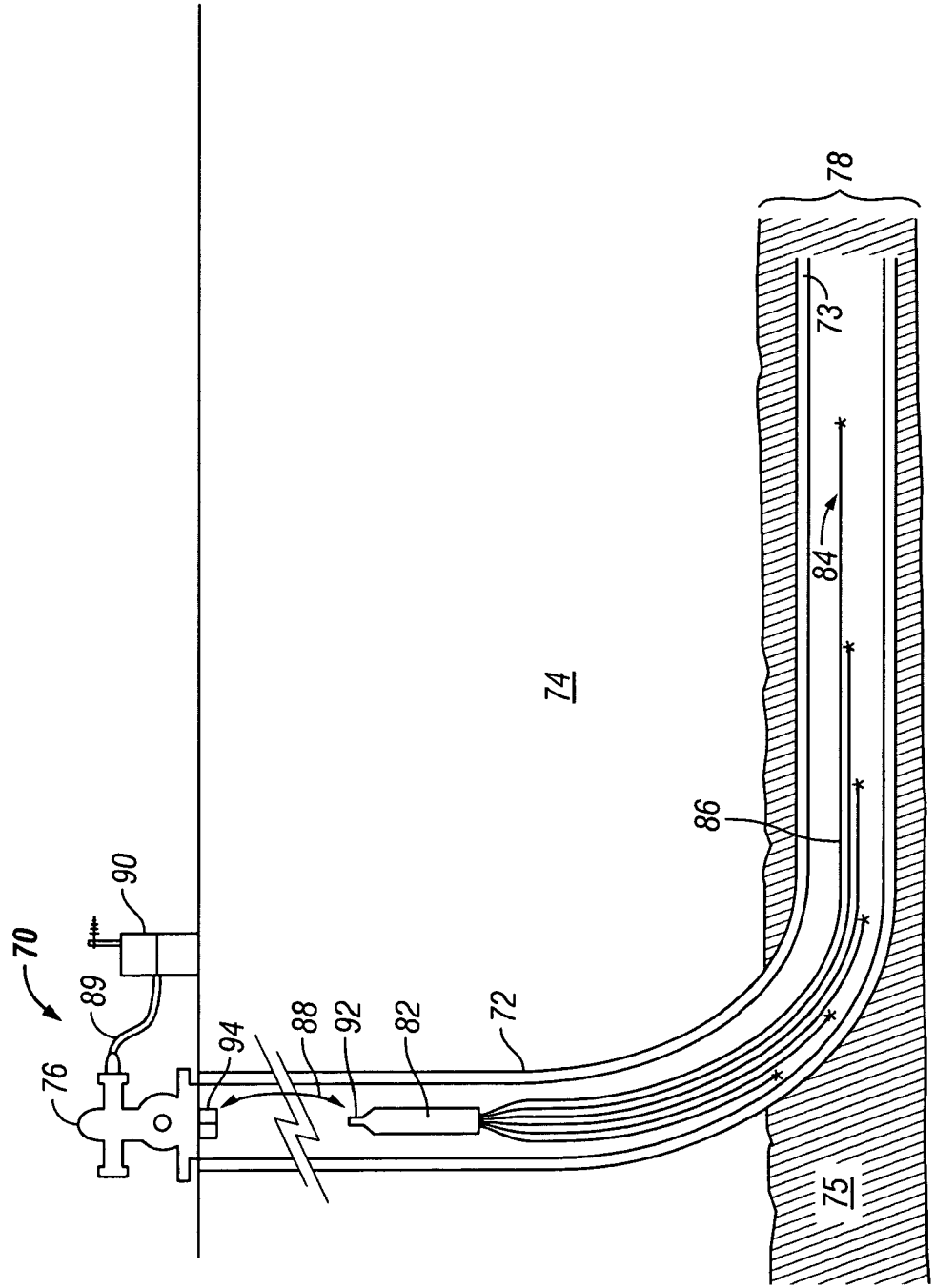
FIG. 3 schematically illustrates an elevation view of a well having a horizontal section that is provided with a signal/data communication system made according to one embodiment of the present invention.

Referring now to FIG. 3 there is shown a hydrocarbon recovery facility 70 for recovering hydrocarbons such as oil and gas from a wellbore 72 having a horizontal section 73 that is formed in a formation 74. A wellhead 76 and associated equipment is positioned over the wellbore 72. The formation 74 has a hydrocarbon layer 75 and an associated heat affected zone 78 created artificially using previously described equipment. An illustrative data acquisition system 70 for measuring temperature in the heat affected zone 78 and/or other downhole locations includes a multi-channel A/D processor 82, one or more temperature sensors 84 and conductors 86 connecting the sensors 84 to the processor 82. In an exemplary arrangement, the sensors 84 are distributed across the heat affected zone 78 so that surface personnel can develop a temperature gradient for the hydrocarbon layer 75. The processor 82 is uphole but proximate to the heat affected zone 78. During operation, the processor 52 converts analog temperature data to digital data and transmits the digital data via a downhole data link 88 and surface communication link 89 to a surface processor 90. The downhole data link 88 includes a downhole transmitter 92 and a surface transmitter 94. The transmitters 92 and 94 can be one-directional or bi-directional. The wireless data link 88 can use a transmission media such as acoustical signals, radio frequency signals, pressure pulses and/or electromagnetic signals wireless data/signal transmission arrangements suitable for a wellbore environment.

The data acquisition systems discussed above are amenable to numerous embodiments. Merely for illustration, there is shown in FIG. 4A one embodiment of aspects of a data acquisition system 100 adapted for use with coiled tubing 102. The data acquisition system 100 includes a downhole processor 104, temperature sensors 106 and associating wiring 108 between the sensors 106 and the processor 104. The coiled tubing 102 has an open end 110 that allows wellbore fluid to flood the interior of the coiled tubing 102 and enable the sensors 106 to measure a parameter of interest relating to the wellbore fluid such as pressure, temperature, chemical make-up, etc. As shown, the downhole processor 104 is positioned in the coiled tubing 102 and transmits temperature data via a communication link 112 to the surface. The processor 104 can include suitable electronics and software to process temperature data such as an analog-to-digital converter (A/D converter or "digitizer"). As is known, the coiled tubing 102 can be a continuous tubular or made up of segments or sections that are coupled together using suitable connectors. Depending on the application, the processor 104 and/or sensors 106 can inside of one continuous length of coiled tubing or production tubing with no subs or ports, positioned inside a coiled tubing segment, in a connector coupling two coiled tubing segments, in a top sub at the uphole end of a coiled tubing string, or a sub that is interposed between coiled tubing segments. Alternatively, the processor 104 can be a separate unit that is positioned external (e.g., adjacent or uphole) to the coiled tubing 102.

Referring now to FIG. 4B, there is shown another embodiment of a data acquisition system 120 adapted for use with coiled tubing 122. The data acquisition system 120 includes a downhole processor 124 that transmits temperature data via a communication link 125 to the surface, temperature sensors 126 and associating wiring 128 between the sensors 126 and the processor 124. The processor 124 can include suitable electronics and/or software to process temperature data such as an A/D converter. The coiled tubing 122 has a closed end 130 that prevents wellbore fluids from entering the interior of the coiled tubing 122. Communication between the sensors 126 and the wellbore fluids is enabled by ports 132 formed in the coiled tubing 122. The ports 132 can be pre-formed or cut into coiled tubing segments or sections. Alternatively, a sub can be constructed with the system 120 and connected to an end of the coiled tubing or between sections of coiled tubing.

Figure 5:
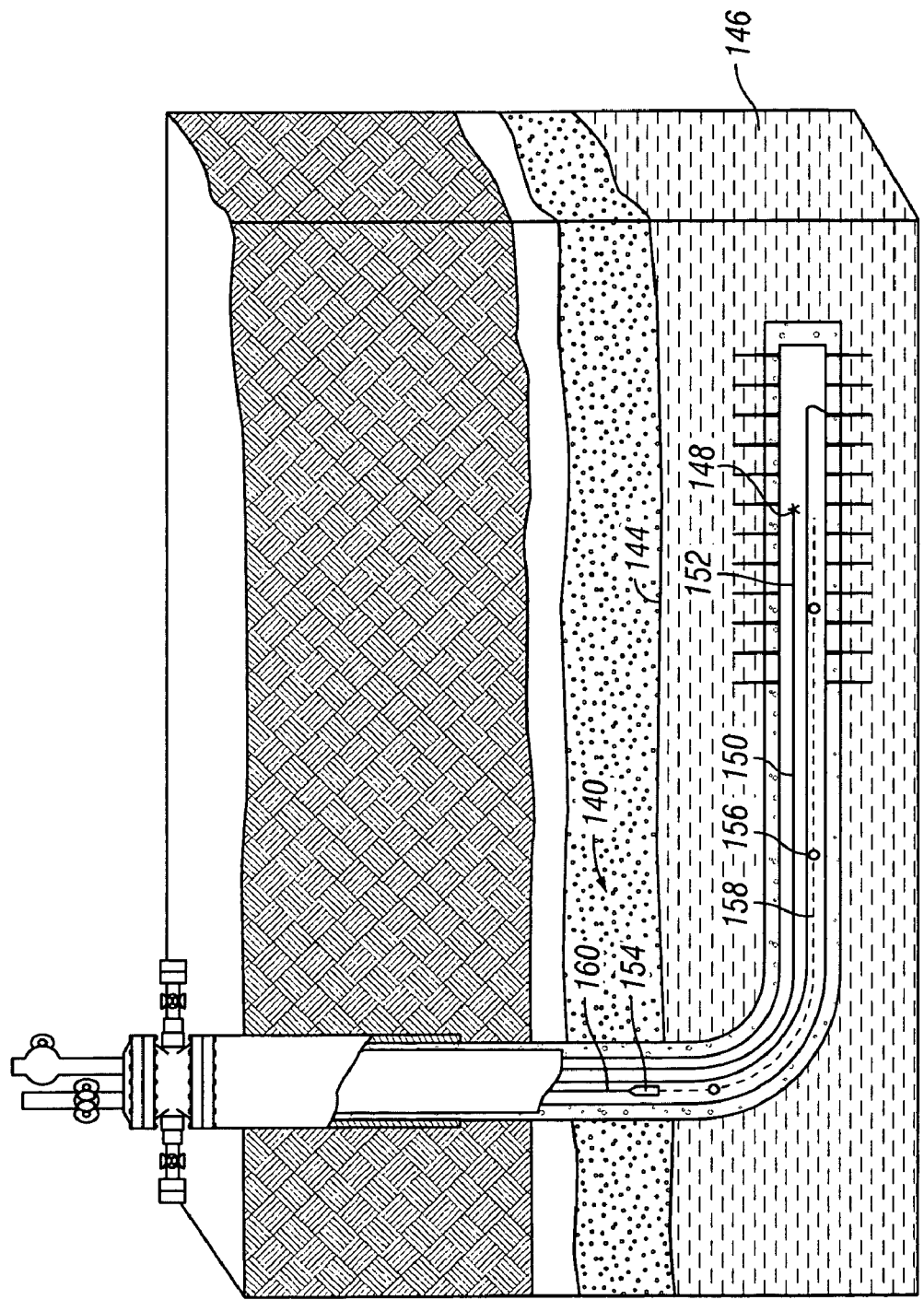
FIG. 5 schematically illustrates a signal/data communication system made according to one embodiment of the present invention that is deployed via a coiled tubing system.

Referring now to FIG. 5, there schematically shown another embodiment of a data acquisition system 140 for monitoring temperature of a heat affected zone 144 associated with a hydrocarbon reservoir 146. The data acquisition system 140 includes a primary tubing string 148 and a string of coiled tubing 150. The primary tubing string 148 and coiled tubing 150 are secured together at their bottom ends by a locking assembly 152. The locking assembly 152 can include mechanical devices or electro-mechanical devices for selectively locking together the primary tubing string 148 and coiled tubing 150. For example, suitable mechanical devices include interlocking arms or splines, a spring detent, biased members (e.g., piston), and shear pins. Devices such as hydraulic or electric motors can also be used to actuate the elements of the locking assembly 152. Additionally, the locking arrangement can use one or more locking members formed of a material responsive to an input such as thermal energy, kinetic energy, chemical reaction, an electrical signal or a magnetic field; e.g., the input responsive material can melt, disintegrate, combust, explode, or change material states (e.g., change from solid to liquid) to release the primary tubing string 148 from the coiled tubing 150. The locking assembly 152 can be actuated from the surface using a signal or actuated by a pre-set condition while downhole such as a timer, pressure variance, mechanical manipulation of a cable, or tubing string, or having a natural or induced temperature change or other means.

The data acquisition system 140 includes a processor 154 positioned outside and adjacent to the heat affected zone 144, sensors 156 positioned along the primary tubing string 148, conductors 158 coupling the sensors 156 to the processor 154, and a data transmission link 160 that transmits data signals from the processor 154 to a surface processor (not shown). In an exemplary installation sequence, the relevant components of the data acquisition system 140 are installed into the primary tubing string 148. Thereafter, the primary tubing string 148 and coiled tubing 150 are connected together using the locking assembly 152. The primary string 148 and coiled tubing 150 are lowered into the wellbore 162 and positioned as needed. In a "piggy back" fashion, coiled tubing 150 is carried or pulled into the wellbore, particularly a deviated section of the wellbore, by the primary string 148. Either by a surface signal or upon application of an input or occurrence of a condition (e.g., a temperature, pressure, depth, time duration), the locking assembly 152 is actuated to release the primary string 148 from the coiled tubing 150. The coiled tubing string 150 can then be extracted from the wellbore 162. In other arrangements the coiled tubing may also be banded together to the tubing string that allows both devices to be lowered into the wellbore together. It should be understood that this sequence is merely illustrative and can be re-arranged as needed for a given situation or system configuration.

Figure 6:
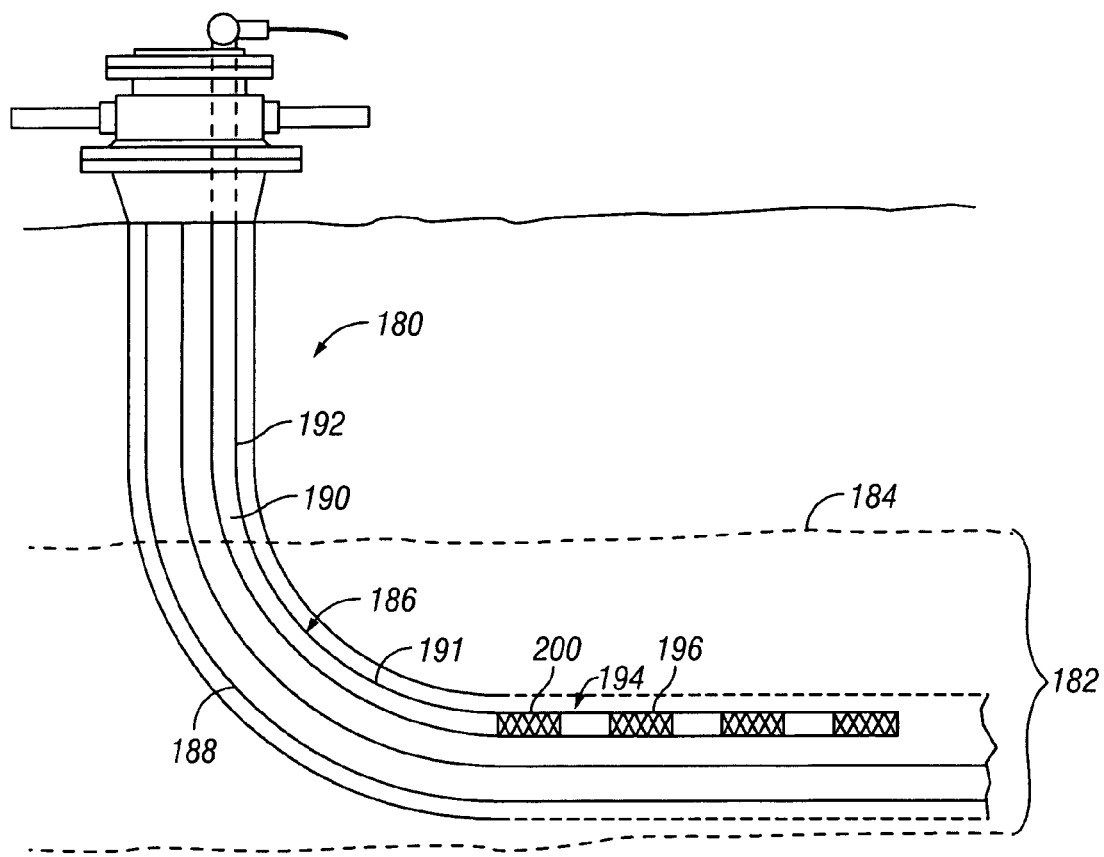
FIG. 6 schematically illustrates a signal/data communication system made according to one embodiment of the present invention that is deployed via another coiled tubing system.

Referring now to FIG. 6, there is schematically shown a data acquisition system 180 for measuring a heat affected zone 182 associated with a hydrocarbon reservoir 184. The data acquisition system 180 can be run in an instrumentation string 186 run parallel with a tubular string 188. The data acquisition system 180 includes a processor 190 positioned outside and adjacent to the heat affected zone 182, thermocouples (not shown) positioned along the instrumentation string 186, conductors (not shown) coupling the sensors to the processor 190, and a data transmission link 192 that transmits data signals from the processor 190 to a surface processor (not shown). For illustrative purposes, there is shown another processor 191 positioned within the heat affected zone 182. The processor 191 can be in addition to or in lieu of the processor 190. The processor 191 is adapted for operation in the relatively hot environment of the heat affected zone 182.

In the FIG. 6 embodiment, which can include features discussed in FIG. 4A-B, the instrumentation string 186 includes a plurality of tubular segments 194 connected together by a plurality of tubular subs 196. The subs 196 are positioned at spaced apart locations where sensor measurements such as pressure and/or temperature are to be taken. Each sub 196 has a port 200 for communicating with the reservoir 184. A plurality of hard-wired temperature-measuring thermocouple sensors (not shown) extend from each sub 196 to the processor 190. The sensors (not shown) are operatively connected with the ports 200 at the various measurement locations. It should be understood that the terms "subs" and "segments" are used in their functional sense rather than the structural sense. For example, a coiled tubing segment can be modified to include ports. The section so modified thereby becomes the "sub". Thus, the subs are not necessarily structurally separate from the coiled tubing segments.

In an embodiment functionally and structurally equivalent to that shown in FIG. 6, a single continuous string of coiled tubing is modified by cutting windows at spaced apart intervals along the coiled tubing. One or more sensors and/or processors are inserted into the side of the coiled tubing string followed by the window being closed by welding or bolting.

Figure 7:
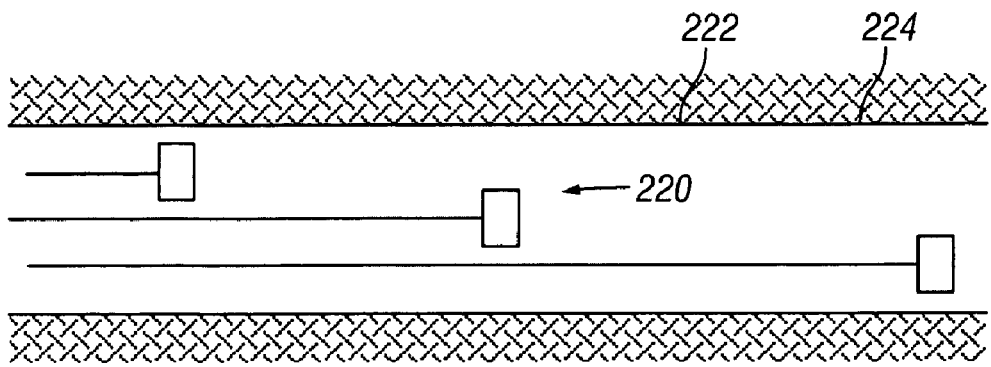
FIG. 7 schematically illustrates an exemplary sensor arrangement positioned in an open hole.
Figure 8:
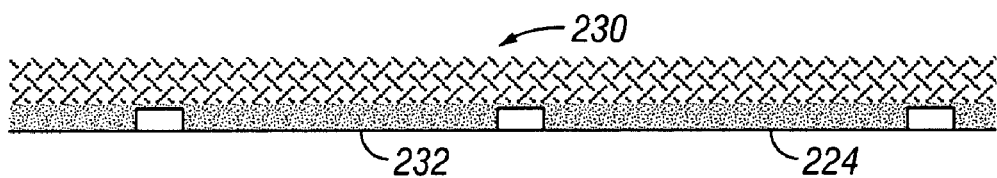
FIG. 8 schematically illustrates an exemplary sensor arrangement positioned external to equipment positioned in a wellbore.

While embodiments of the present invention have been discussed in the context of coiled tubing, any number of arrangements can be used to instrument a vertical and/or a horizontal well with temperature sensors to obtain temperature gradients or profiles for a selected heat affected zone. For example, the data acquisition system can be position outside of wellbore equipment such as casing, cemented in an open hole, and deployed either inside or outside wellbore equipment and tubulars such as drill pipe, production pipe, casing, liner, slotted liner or screen, or on the inside or outside of tubing or coiled tubing. Referring now to FIG. 7, there is shown a sensor package 220 in an open hole section 222 of a wellbore 224. The sensor package 220 can optionally be cemented in place. Referring now to FIG. 8, there is shown a sensor package 230 positioned outside a casing, liner, or screen 232 in a wellbore 234. The casing liner or screen can be slotted or unslotted. The sensor package 220 can optionally be cemented in place during cementing of the casing liner, or screen 232.

Figure 9:
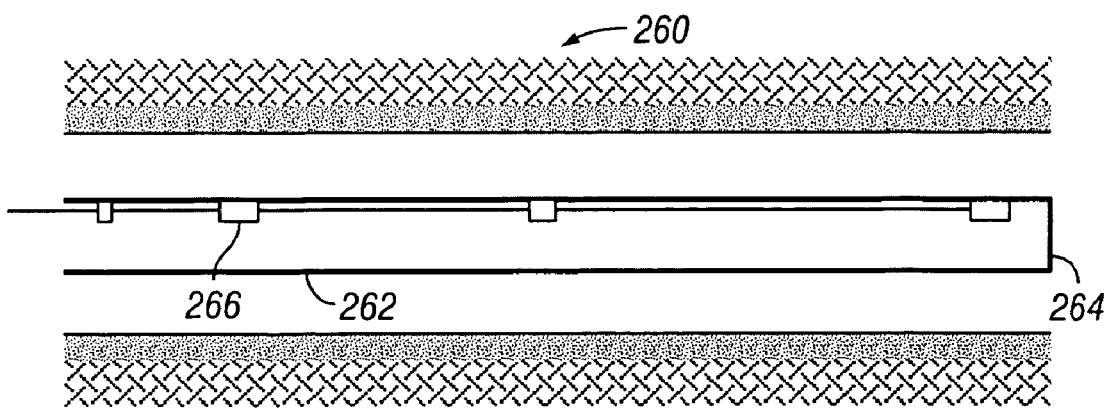
FIG. 9 schematically illustrates an exemplary sensor arrangement positioned internal to a wellbore tubular and adapted to indirectly measure a parameter of interest outside of the wellbore tubular.

Referring now to FIG. 9, there is shown an instrumentation string 260 formed of tubing 262 having a sealed end 264. The tubing 262 can be coiled tubing, production tubing, drill pipe, liners, casing, or other tubulars used in a wellbore. Sensors 266 mounted inside the tubing 264 indirectly measure one or more selected parameters such as pressure or temperature by sensing a phenomena related to an effect outside of the coiled tubing 262. For example, an approximate temperature outside the tubing 262 can be obtained through thermal conduction of the temperature through the wall of the tubing 262 to a temperature sensor 266 located inside the tubing 262. In another example, a strain sensor 266 mounted inside of the tubing 262 indirectly measures the strain or stressed applied to the tubing 262 or adjacent material such as cement, fluid or an earthen formation. In other embodiments, the tubing 262 remains open, i.e., does not have a sealed end 264.

Figure 10C:
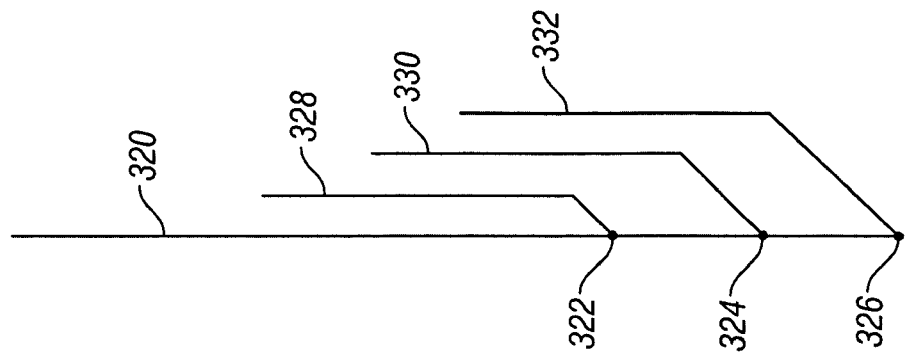
FIG. 10A-10C schematically illustrates data carrier exemplary data carrier arrangements for thermocouples used in accordance with embodiments of the present invention.
Figure 10B:
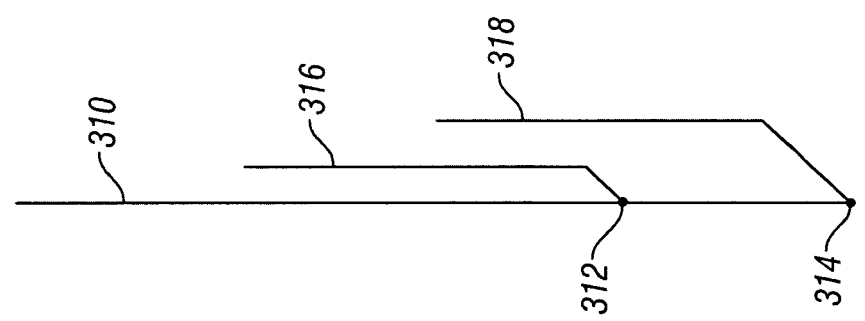
Figure 10A:
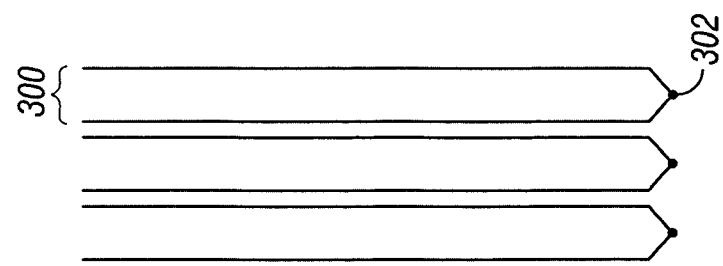

Referring now to FIGS. 10A-10C, there are shown illustrative arrangements for data carriers suitable for connecting a thermocouple to a processor. FIG. 10A illustrates a basic arrangement, or "simplex," wherein a pair of conducting wires 300 made from different metals connect a thermocouple end point 302 to a processor (not shown). FIG. 10B illustrates a "duplex" arrangement wherein a lead conducting wire 310 from a processor (not shown) connects to a first and a second thermocouple end point 312, 314 but each thermocouple end point 312,314 has a separate return wire 316,318 respectively connecting to a processor (not shown). The lead wire 310 is made from metal different from the return wires 316,318. FIG. 10C illustrates a "triplex" arrangement wherein a lead conducting wire 320 from a processor (not shown) connects to a first, a second, and a third thermocouple end point 322,324,326 but each thermocouple end point 322, 324,326 has a separate return wire 328,330,332 respectively connecting to a processor (not shown). The lead wire 320 is made from metal different from the return wires 328,330,332.

Referring now to FIGS. 11A-11C, there are shown illustrative arrangements for data carriers adapted for use in conjunction with fiber optic sensors. A fiber optic system can be configured to multiplex multiple fiber optic sensors on the same fiber using frequency division techniques and thereby reduce the number of wires or cables connecting individual sensors to a processor. FIG. 11A illustrates an arrangement wherein individual wires 400 connect each fiber optic sensor 402 to a processor (not shown). FIG. 11B illustrates an arrangement wherein one fiber optic cable 410 from a processor (not shown) connects to a first and a second fiber optic sensors 412, 414. The processor (not shown) communicates with each sensor 412,414 via a different frequency, thereby enabling the use of a single cable 410. FIG. 11C illustrates an arrangement wherein a fiber optic wire 420 from a processor (not shown) connects to a first, a second, and a third fiber optic sensor 422,424,426 via branches 428,430,432. As can be seen, the above-described arrangements allow multiple sensors to be connected to the processor using one or more fiber data carriers.

From the above, it should be appreciated that in aspects the present invention provides systems and methods for obtaining parameter measurements from selected locations in a wellbore associated with thermal recovery projects. Because the selected locations can be distributed along zones of interest, such as a heat affected zone, a well operator can determine a profile or gradient for a selected parameter of interest. While temperature measurements have been discussed at length above, it should be appreciated that the teachings of the present invention can also be used to obtain pressure measurements, fluid flow rates, fluid make up, and other parameters relating to the wellbore environment. In other aspects, sensors used in connection with the present invention can be used to monitor one or more parameters relating to the condition of wellbore tubulars and equipment. Exemplary sensors for such applications include casing corrosion monitors, casing and tubular strain sensors.

The foregoing description is directed to particular embodiments of the present invention for the purpose of illustration and explanation. It will be apparent, however, to one skilled in the art that many modifications and changes to the embodiment set forth above are possible without departing from the scope of the invention. It is intended that the following claims be interpreted to embrace all such modifications and changes.

What is claimed is:

1. A system for acquiring data from a heat affected zone associated with a thermal recovery hydrocarbon reservoir in a subterranean formation that is intersected by a wellbore, comprising:
   a casing cemented in the wellbore;
   a primary tubing string in the wellbore;
   a coiled tubing string positioned along the primary tubing string;
   a locking assembly releasably coupling the primary tubing string to the coiled tubing string, the locking assembly configured to be responsive to a signal transmitted from the surface;
   a processor positioned at a selected location along a wellbore that intersects the reservoir, the selected location being substantially outside of the heat affected zone;
   a plurality of sensors distributed along the primary tubing string and at least partially along the heat affected zone; and
   a data link coupling the processor to a surface interface.

2. The system according to claim 1, wherein the plurality of sensors includes at least one sensor positioned inside a wellbore tubular.

3. The system according to claim 2, wherein the at least one sensor positioned inside the primary tubing string indirectly measures a parameter of interest outside of the primary tubing string.

4. The system according to claim 2, wherein the at least one sensor positioned inside the primary tubing string indirectly measures a parameter of interest outside of the primary tubing string using one of (i) thermal conduction through the primary tubing string, (ii) stress in a wall of the primary tubing string, and (iii) strain in the wall of the primary tubing string.

5. The system according to claim 2, wherein the primary tubing string has an open end to allow wellbore fluid to enter the primary tubing string.

6. The system according to claim 2, wherein the primary tubing string includes a substantially sealed end, the primary tubing string including at least one port that allows wellbore fluid to reach the sensors.

7. The system according to claim 2, wherein the primary tubing string is configured to null the coiled tubing into the wellbore.

8. The system according to claim 2, wherein the data link transmits data via a transmission media selected from a group consisting of: (i) acoustical signals, (ii) radio frequency signals, (iii) electromagnetic signals, and (iv) pressure pulses.

9. The system according to claim 1, wherein the data link comprises a single cable; and wherein each sensor is coupled to the processor with at least one data carrier.

10. The system according to claim 9, wherein the plurality of sensors include at least one thermocouple and wherein the at least one data carrier couples the at least one thermocouple to the processor using an arrangement selected from a group consisting of: (i) a simplex wire arrangement, (ii) a duplex wire arrangement, and (iii) a triplex wire arrangement.

11. The system according to claim 9, wherein the plurality of sensors include at least one fiber optic sensor and the at least one data carrier includes frequency multiplexed optical fiber coupling the at least one fiber optic sensor to the processor.

12. The system according to claim 1, wherein the plurality of sensors includes one of (i) a thermocouple, and (ii) a fiber optic sensor.

13. The system according to claim 1, wherein the data link comprises at least one data cable, and wherein each sensor is coupled to the processor with at least one data carrier, wherein there is a fractional relationship between the number of data cables and the number of data carriers.

14. The system according to claim 1, wherein the processor processes data using one of: (i) a digitizer, (ii) multiplexor, (iii) signal processor, (iv) a switching device, (v) a relay, (vi) a laser diode, (vii) a laser, (viii) an optical light detector, and (ix) an optical filtering devices.

15. The system according to claim 1, wherein the plurality of sensors include a first set of sensors distributed in the heat affected zone in the wellbore and a second set of sensors positioned outside of the heat affected zone in the wellbore.

16. The system according to claim 1, further comprising an injector well configured to generate the heat affected zone.

17. A system for determining a temperature gradient for a heat affected zone associated with a thermal recovery hydrocarbon reservoir in a subterranean formation, the reservoir being intersected by a wellbore and being heated by an artificial source,
   the system comprising:
   a casing cemented in the wellbore;
   a primary tubing string in the wellbore;
   a coiled tubing string positioned along the primary tubing string;
   a locking assembly releasably coupling the primary tubing string to the coiled tubing string, the locking assembly configured to be responsive to a signal transmitted from the surface;
   a plurality of temperature sensors distributed along the primary tubing string and at least partially along the heat affected zone, the temperature sensors providing temperature measurements;
   a downhole processor positioned outside of the heat affected zone, the processor programmed to receive and digitize the temperature measurements; and a data cable coupled to the down hole processor, the data cable adapted to convey the temperature measurements to a surface interface.

18. The system of claim 17, wherein the primary tubing string includes an open end for receiving a fluid and wherein the plurality of sensors are configured to measure a parameter of interest of the fluid.

19. The system of claim 17, wherein the primary tubing string includes a plurality of ports communicating with the reservoir and wherein the plurality of sensors are configured to measure a parameter of interest via the ports.

20. A method for acquiring data from a heat affected zone associated with a thermal recovery hydrocarbon reservoir in a subterranean formation, comprising:

cementing a casing in a wellbore intersecting the formation;

positioning a primary tubing string in the wellbore;

positioning a coiled tubing string along the primary tubing string; releasably locking assembly the primary tubing string to the coiled tubing string, the locking assembly configured to be responsive to a signal transmitted from the surface;

positioning a processor at a selected location along a wellbore that intersects the reservoir, the selected location being substantially outside of the heat affected zone;

distributing a plurality of sensors along the primary tubing string, the wellbore and at least partially along the heat affected zone;

coupling the processor to a surface interface with a data link; and transmitting a signal to cause the locking assembly to unlock the primary tubing string from the coiled tubing.

21. The method according to claim 20, wherein the plurality of sensors includes one of (i) a thermocouple, and (ii) a fiber optic sensor.

22. The method according to claim 20, wherein the data link transmits data via a transmission media selected from a group consisting of: (i) acoustical signals, (ii) radio frequency signals, (iii) electromagnetic signals, and (iv) pressure pulses.

23. The method according to claim 20, further generating the heat affected zone.

* * * * *